2,939,879
Patented June 7, 1960

2,939,879
PROCESS FOR PREPARING ALLYL ESTERS OF CARBOXYLIC ACIDS

Aldo De Benedictis, Berkeley, Calif., assignor to Shell Oil Company, a corporation of Delaware No Drawing. Filed Feb. 7, 1957, Ser. No. 638,697

12 Claims. (Cl. 260—475)

This invention relates to a new process for preparing unsaturated esters. More particularly, the invention relates to an improved process for preparing beta,gamma-ethylenically unsaturated esters of organic carboxylic acids.

Specifically, the invention provides a new and highly efficient process for preparing beta,gamma-ethylenically unsaturated esters of organic carboxylic acids which comprises heating an alkali metal salt of the acid with a beta,gamma-ethylenically unsaturated halide in an aqueous medium and adding an alkaline material to the reaction mixture as to maintain the pH of the reaction mixture throughout the course of the reaction within the range of 6.0 to 8.0 and then recovering the desired ester from the reaction mixture.

As a preferred embodiment, the invention provides a method for making diallylic phthalates which comprises heating a disodium salt of a phthalic acid with an allylic halide in an aqueous medium and then adding alkaline material to the reaction mixture so as to maintain the pH of the mixture at about 6.5.

Allylic esters such as diallyl phthalate, have been found to be particularly useful in the preparation of resins and plastics. These esters, however, have been found to be difficult to prepare economically. The conventional acid catalyzed esterification of the acid or anhydride with the alcohol is troublesome in that the esters are discolored and the yields obtained in the reaction and purification procedures are quite low. It has been suggested that the esters be prepared by reacting the acid anhydride with an allylic halide, but the conversions obtained by this method have been little better than those obtained with the conventional acid catalyzed acid-alcohol esterification process.

It is therefore an object of the invention to provide a new process for preparing unsaturated esters. It is a further object to provide a new method for preparing allylic esters that will give high yields of product. It is a further boject to provide a new method for preparing allylic esters in substantially colorless form. It is a further object to provide a new and economical method for preparing allylic esters of aromatic polycarboxylic acids. Other objects and advantages of the invention will be apparent from the following detailed description thereof.

It has now been discovered that these and other objects may be accomplished by the process of the invention which comprises heating an alkali metal salt of a carboxylic acid with a beta,gamma-ethylenically unsaturated monohalide in an aqueous medium and adding an alkaline material to the reaction mixture so as to maintain the pH of the reaction mixture within the range of 6.0 to 8.0 and then recovering the desired ester from the reaction mixture. It has been found that this new process produces the esters in much higher yields than has been possible heretofore. Thus, yields obtained by this method are of the order of 80% to 95%, while those obtained from the prior methods have ranged only from 35% to 60%. In addition, the esterification is accomplished with the use of the generally cheaper allylic halides instead of the allylic alcohols and yields esters which are substantially colorless, thus eliminating extensive purification procedures. Further, the esterification is accomplished in much shorter periods of time than is generally required for the conventional acid catalyzed acid-alcohol esterification process.

As noted above, the esters are prepared according to the present process by reacting an alkali salt of the organic carboxylic acid with an allylic halide in an aqueous medium under critical pH control. If the acid is a polycarboxylic acid, the salts may be a complete salt, i.e. one wherein all of the carboxyl groups have been converted to salt groups, or it may be a salt of a partial ester of the polycarboxylic acids with any type monohydric alcohol. Thus, for example, the salt may be disodium phthalate or may be sodium allyl phthalate.

The acids whose sodium salts are employed in the process of the present invention may be any organic acid. These acids may be aliphatic, cycloaliphatic, aromatic or heterocyclic and may be saturated or unsaturated. They may also be mono- or polycarboxylic acids and may be substituted with a variety of different substituents, such as alkyl radicals, ether radicals and the like. Examples of the acids include, among others, acetic acid, propionic acid, butyric acid, acrylic acid, adipic acid, succinic acid, benzoic acid, cyclohexanoic acid, tert-butylcyclohexanoic acid, toluic acid, p-tert-butylbenzoic acid, 3,5-ditertiary-butylbenzoic acid, pyromellitic acid, orthophthalic acid, isophthalic acid, terephathalic acid, diphenyl-4,4'-dicarboxylic acid, dicarboxydiphenylmethane, dicarboxyphenyltolylmethane, 3 - hydroxy-1,4-benzenedicarboxylic acid, 4-butyl-1,3-benzenedicarboxylic acid, 5-isopropyl-1,4-benzenedicarboxylic acid. Preferred acids are the mononuclear aromatic dicarboxylic acids containing from 8 to 16 carbon atoms.

Examples of suitable salts of the above acids include, among others, sodium acetate, sodium butyrate, sodium benzoate, potassium cyclohexanecarboxylate, disodium phthalate, sodium allyl phthalate, sodium methallyl isophthalate, sodium ethallyl terephathalate, dipotassium terephthalate, disodium salt of 3-ethyl-1,4-benzenedicarboxylic acid, sodium allyl 5-isopropyl-1,4-benzenedicarboxylate, sodium ethyl phthalate and sodium butyl phthalate.

The salts of these acids may be prepared by any suitable method, such as by treating the acid, or the partial ester of the acid, with an appropriate quantity of an aqueous solution of a sodium or potassium base or salt, such as sodium hydroxide. The salts of the aromatic acids may be removed from the resulting aqueous solution or the aqueous solution may be used directly in the process of the invention.

The beta,gamma-ethylenically unsaturated halides used in the process are those monohalides having a halogen atom attached to a carbon atom one carbon atom removed from the ethylenic double bonds. Preferred halides are those of the general formula

(often referred to as allylic halides) wherein R is hydrogen or a hydrocarbon radical, and preferably an alkyl radical containing from 1 to 8 carbon atoms. Examples of these halides include, among others, allyl chloride, methallyl chloride, 1,3-dichloropropene, 1 - chloro - 3-phenyl-2-propene, 1-chloro-1-xylyl-2-propene, 1-chloro-3-chlorophenyl - 2 - propene, and 1-chloro-2-isobutyl-2-propene. Particularly preferred are the 2-alkenyl chlorides and especially those containing from 3 to 10 carbon atoms.

The proportions of the salt and the unsaturated halide employed in the reaction may vary, depending particularly upon the type of reactants. In general, the salts should be reacted with at least a chemical equivalent amount of the halide. As used throughout the specification and claims, the expression "chemically equivalent amount" is meant the amount of the reactant needed to furnish approximately one mole of the monohalide for every sodium atom present in the salt molecule. Thus, one of the disodium phthalate should be reacted with at least 2 moles of the allylic halide and one mole of the sodium allyl phthalate should be reacted with at least one mole of the allylic halide. Preferably the salts are reacted with the halide in chemical equivalent ratios varying from 1:1 to 1:5, and more preferably from 1:1.5 to 1:3.

The reaction is conducted in an aqueous medium and preferably that in which the sodium salt of the acid is formed by reacting the acid or anhydride with a sodium salt as noted above. The amount of water in the reaction mixture is preferably at least sufficient to keep sodium chloride in solution. This is generally accomplished by adding say 20% to 30% aqueous NaOH to the acid or anhydride to form the salt and then conducting the reaction in the resulting aqueous medium.

As noted above, a special and critical feature of the process is the maintenance of the pH of the reaction mixture within the range of 6.0 to 8.0 during the course of the reaction. This is accomplished by measuring the pH of the mixture, such as by the use of electrodes, and adding an alkaline material to the reaction in the amount needed to keep the pH within the above-noted range. The alkaline material may be any suitable material, such as sodium hydroxide, potassium hydroxide, sodium bicarbonate and the like, or mixtures thereof. In most cases, the amount of alkaline material, such as sodium hydroxide, added will generally vary from about .1 to .5 times the amount of the allylic halide present in the initial reaction mixture. Preferably, sufficient alkali is added during the formation of the sodium salt of the organic acid to form the salt and at the same time to bring the pH of the reaction mixture up to the above-noted level. Additional alkaline material is then added to keep the pH at the desired level throughout the reaction. If the initial pH is not within the above range, then additional amounts should be added at the beginning to bring the level up to the range and then maintained there by subsequent additions.

The temperature employed may also vary over a considerable range. The temperature should be at least high enough to effect the reaction but should not be above the decomposition temperature of the reactants or products. As a general proposition, temperatures ranging from 50° C. to 200° C. can be used in the reaction, with temperatures ranging from 90° C. to 175° C. being more preferred. For the preparation of the esters of the allylic halides and the phthalic acids, temperatures ranging from 100° C. to 150° C. are particularly preferred. Atmospheric, superatmospheric or subatmospheric pressures may be used as desired or necessary.

Some of the esters are easily susceptible to polymerization and in prior processes it has been desirable to employ a polymerization inhibitor in the reaction mixture. In the present process, however, the esters are formed without apparent loss to polymers so there is no need of adding such inhibitors to the reaction mixture.

The time of reaction will vary depending on the reactants and temperature. The reaction should preferably be continued until one of the reactants is completely utilized. On a batch basis, the reaction should generally not take more than 1 to 2 hours.

The esters formed in the reaction mixture may be recovered by any suitable method, such as distillation, extraction, crystallization and the like. In most instances, the ester may be recovered by separating the organic layer from the aqueous layer, washing the organic layer and then distilling the washed residue to recover the ester.

In the preferred method of operation, sufficient aqueous sodium hydroxide is added to the acid anhydride so as to form an aqueous solution of the sodium salt. The allyl halide is then added the mixture heated and the alkaline material added to maintain the pH.

The process may be conducted batch-wise or in a semicontinuous or continuous manner as desired. The process is particularly adapted for use on a continuous manner and that is the preferred way of conducting the process. When the process is used to prepare the esters of phthalic acids, the process is preferably conducted by preparing a slurry of the sodium salt containing water and then adding this slurry to the reaction zone where it comes in contact and reacts with the allylic halide. The excess halide and other volatile components are removed overhead and a portion of the mixture taken to a separator where it forms an aqueous layer and organic layer. The organic layer is preferably stabilized, washed with dilute sodium hydroxide and then distilled to recover the ester.

The apparatus used for the process may be constructed in any manner. When using large amounts of water, as in the above-described preferred method of operation, the reaction chamber as well as most of the recovery apparatus, preferably prepared from or lined with noncorrosive material, such as glass, platinum, gold, Hastelloy and the like.

To illustrate the manner in which the invention may be carried out, the following examples are given. It is to be understood, however, that the examples are for the purpose of illustration and the invention is not to be regarded as limited to any of the specific reactants or conditions recited therein. Unless otherwise indicated, parts disclosed in the examples are parts by weight.

*Example 1*

This example illustrates the unexpected improvement in yield and quality of diallyl phthalate obtained by using the process of the invention.

The apparatus used in this experiment was a stainless steel turbomixer heated with high pressure steam and equipped with a set of tungsten silver-silver chloride electrodes. The E.M.F. across the electrodes was measured with a conventional potentiometer.

(a) 1.5 moles of sodium hydroxide (27% aqueous solution) and 0.75 mole of phthalic anhydride were charged to the turbomixer, stirred and cooled. 2.61 moles of allyl chloride were then added and the mixture heated at 120° C. for about 1.5 hours. During that time 0.47 mole of sodium hydroxide (27% aqueous solution) was pumped into the mixture at a rate required to maintain the pH at 6.5.

At the end of the reaction, the diallyl phthalate was recovered from the reaction mixture. This processing involved phase separation of the water and organic phases, caustic washing of the organic phase, stabilization of the washed organic phase containing the diallyl phthalate to a kettle temperature of about 125° C. at 1 to 3 mm. pressure, and flash vacuum distillation of the stabilized diallyl phthalate. 0.654 mole of diallyl phthalate was recovered. This represented an 87% yield based on the anhydride charge. The diallyl phthalate recovered was almost water white and could be used in intended resin applications without further purification to remove discoloring matter.

(b) Diallyl phthalate was prepared by a related method as in (a) above with the exception that no steps were taken to maintain control over the pH. The yield in this case was very low as noted below.

In this experiment 0.75 mole of phthalic anhydride, 2.25 moles of allyl chloride and 2.25 moles of sodium hydroxide were heated together at 120° C. for 60 minutes. No caustic was added during the course of the reaction and the pH varied all the way from 10 to 4.3. In this case, the yield of diallyl phthalate recovered was 40% based on the anhydride charge.

(c) Experiment (a) above was repeated with the exception that in this case caustic was added during the course of the reaction but the pH was allowed to vary from 7 to 5.3. In this case, the yield of diallyl phahalate was 47% based on the anhydride charge.

(d) In another experiment, related to (c) above wherein 0.75 mole of phthalic anhydride was combined with 2.25 moles of allyl chloride and 0.89 mole of sodium hydroxide, the mixture heated at 120° C. for 60 minutes and the pH maintained at 5.5, the yield of diallyl phthalate was only 30%.

(e) Experiment (d) is repeated wtih the exception that the pH was maintained at 8.5. In this case the yield of diallyl phthalate was about the same as that obtained in (d) above, i.e. about 30%.

Example II 2.5 moles of monoallyl phthalate and 2.5 moles of sodium hydroxide (27% aqueous solution) were charged to the turbomixer, stirred and cooled. 5 moles of allyl chloride were then added and the mixture heated at 120° C. 5.0 moles of sodium bicarbonate were added so as to maintain the pH at about 6.5. At the end of the reaction, the diallyl phthalate was recovered as in Example I(a). The yield of diallyl phthalate recovered was 90% based on the phthalate charge. The ester was substantially water white and could be used for the intended resin applications without further purification.

Example III 8.0 moles of acetic acid and 8.00 moles of sodium hydroxide (27% aqueous solution) were charged to the turbomixer, stirred and cooled. 12 moles of allyl chloride were then added and the mixture heated at 120° C. for 90 minutes. 1.16 moles of sodium hydroxide was added during the course of the reaction so as to maintain the pH at 6.5. At the end of the reaction, allyl acetate was recovered as in Example I(a). The yield of allyl acetate was about 80% based on the acetic acid charge. The ester was substantially water white and could be used for the intended resin applications without further purification.

Example IV

Ethyl hydrogen phthalate was made readily by dropping ethyl alcohol into an equimolar quantity of stirred molten phthalic anhydride. 0.75 mole of the ethyl hydrogen phthalate was combined with 0.75 mole of sodium hydroxide (27% aqueous solution) in the turbomixer as indicated in the preceding example. 2.6 moles of allyl chloride were then added and the mixture heated at 120° C. for about 1 hour. During that time, sodium hydroxide was added to maintain the pH at 6.5. The allyl ethyl phthalate was recovered from the reaction mixture as shown in Example I(a). The yield of allyl ethyl phthalate was about 80% based on the ethyl hydrogen phthalate charge. The ester was recovered in substantially white form.

Example V 0.63 mole of isophthalic acid and 1.5 moles of sodium hydroxide (27% aqueous solution) added to form the disodium isophthalate. 2.25 parts of allyl chloride were then added and the mixture heated to 120° C. for 60 minutes. 1.0 mole of sodium hydroxide was added to keep the pH within the range of 6 to 8. Diallyl isophthalate was recovered from the mixture as in Example I(a). The diallyl isophthalate was recovered in about 78% yield based on the isophthalic acid charge. The ester was recovered in substantially white form.

Example VI 1.5 moles of a mixture of aromatic monocarboxylic acids (mixture of p-tert-butyl-benzoic acid, m-tert-butylbenzoic acid, toluic acid obtained as bottom product from oxidation of p-butyltoluene) was combined with 3.0 moles of NaOH and the mixture stirred and cooled. 3.0 moles of allyl chloride was added to the mixture and the mixture heated to 120° C. for 120 minutes. NaOH was added to maintain the pH at about 6.5 to 8. The allyl esters were recovered as shown in Example I(a). The yield of ester was 82% based on the acid charge.

Example VII

Example I(a) was repeated with the exception that methallyl chloride was employed instead of allyl chloride. The dimethallylphthalate was also recovered in very high yield in this process and was obtained in substantially water white form.

Example VIII

Example I(a) is repeated with the exception that the 4-tert-butylphthalic anhydride is employed instead of the phthalic anhydride. The diallyl 4-tert-butylphthalate is recovered in high yield and in substantially water white form.

In all of the preceding Examples I to VIII, no polymerization inhibitor was added yet there were no apparent polymer formations. The refractive index of the crude and distilled products were the same.

I claim as my invention:

1. A process for preparing an allylic ester which consists of heating and thereby effecting reaction between (a) a 2-alkenyl monochloride of from 3 to 10 carbon atoms composed of only the chlorine, carbon and hydrogen atoms, with (b) an alkali metal salt of an acid, said acid being selected from the group consisting of lower alkanoic acids, lower alkenoic acids, lower alkanedioic acids, lower cycloalkanoic acids, benzene carboxylic acids, and lower alkyl-substituted benzene carboxylic acids containing from 8 to 16 carbon atoms, with the proviso that said benzene acids and alkyl-substituted acids contain up to 4 carboxyl groups, said reaction being conducted in an aqueous medium and adding alkaline material to maintain the pH of the reaction mixture throughout the course of the reaction within the range of from 6.0 to 8.0, and recovering allylic ester from the reaction mixture.

2. A process as in claim 1, wherein the salt is a sodium salt of a half ester of an aromatic dicarboxylic acid and an aliphatic monohydric hydrocarbon alcohol containing up to 10 carbon atoms.

3. A process as in claim 1 wherein the salt and the monochloride are combined in a mole ratio of between about 1:2 to 1:4.

4. A process as in claim 1 wherein the salt is a disodium salt of an aromatic dicarboxylic acid.

5. A process as in claim 1 wherein the monochloride is allyl chloride.

6. A process as in claim 1 wherein the acid is acetic acid.

7. A process for preparing diallyl phthalate which consists of heating disodium phthalate with allyl chloride in a mole ratio of 1:2 to 1:4 in an aqueous medium and then adding alkaline material during the reaction to maintain the pH of the reaction mixture at about 6.5.

8. A process as in claim 7 wherein the alkaline material is sodium bicarbonate.

9. A process for preparing diallyl phthalate which consists of heating at a temperature between 100° C. and 200° C. a mixture containing a disodium salt of phthalic acid with allyl chloride in a mole ratio of 1:2 in an aqueous medium and then adding aqueous sodium hydroxide throughout the course of the reaction so as to maintain the pH at about 6.5.

10. A process for preparing diallyl terephthalate which consists of heating at a temperature between 100° C. and 200° C. a mixture containing a disodium salt of terephthalic acid with allyl chloride in a mole ratio of 1:2 in an aqueous medium and adding an alkaline material throughout the course of the reaction so as to maintain the pH at about 6.5.

11. A process for preparing diallyl isophthalate which consists of heating at a temperature between 100° C. and 200° C. sodium salt of isophthalic acid with allyl chloride in a mole ratio of 1:2 in an aqueous medium and adding an alkaline material throughout the course of the reaction so as to maintain the pH at about 6.5.

12. A process for preparing allyl acetate which consists of heating at a temperature between 100° C. and 200° C. sodium acetate with allyl chloride in a mole ratio of about 1:2 in an aqueous medium and adding NaOH to the mixture to maintain the pH at about 6.5 throughout the course of the reaction.

References Cited in the file of this patent

UNITED STATES PATENTS

| | | |
|---|---|---|
| 2,207,613 | Coleman et al. | July 9, 1940 |
| 2,275,466 | Pollack et al. | Mar. 10, 1942 |
| 2,275,467 | Pollack et al. | Mar. 10, 1942 |
| 2,296,823 | Pollack et al. | Sept. 22, 1942 |

OTHER REFERENCES

Fieser et al.: "Organic Chemistry," pp. 343, 649, Reinhold, 1956.

Gilman: "Organic Chemistry," vol. 1, pp. 1004 to 1006, 1013 to 1019, J. Wiley, 1943.